(12) United States Patent
Salour et al.

(10) Patent No.: US 11,736,970 B1
(45) Date of Patent: *Aug. 22, 2023

(54) APPROACHES FOR EVALUATING CALL QUALITY

(71) Applicant: 8×8, Inc., Campbell, CA (US)

(72) Inventors: Mehdi Salour, Campbell, CA (US); Raghu Rengarajan, Campbell, CA (US)

(*) Notice: Subject to any disclaimer, the term of this patent is extended or adjusted under 35 U.S.C. 154(b) by 86 days.

This patent is subject to a terminal disclaimer.

(21) Appl. No.: 17/175,918

(22) Filed: Feb. 15, 2021

Related U.S. Application Data

(63) Continuation of application No. 16/444,895, filed on Jun. 18, 2019, now Pat. No. 10,932,153, which is a
(Continued)

(51) Int. Cl.
*H04L 12/28* (2006.01)
*H04W 28/02* (2009.01)
(Continued)

(52) U.S. Cl.
CPC ......... *H04W 28/0236* (2013.01); *H04L 1/004* (2013.01); *H04L 1/20* (2013.01); *H04L 65/1069* (2013.01); *H04L 65/403* (2013.01); *H04L 65/70* (2022.05); *H04L 65/80* (2013.01); *H04M 1/2535* (2013.01); *H04W 12/02* (2013.01); *H04W 24/06* (2013.01); *H04L 47/38* (2013.01)

(58) Field of Classification Search
CPC .......... H04L 1/20; H04L 65/80; H04W 24/06; H04M 1/2535
USPC .......................... 370/241, 252, 329, 386, 356
See application file for complete search history.

(56) References Cited

U.S. PATENT DOCUMENTS 6,782,080 B2 8/2004 Leivo et al.
7,099,281 B1* 8/2006 Conway ................... H04L 1/20
370/252
(Continued)

FOREIGN PATENT DOCUMENTS

WO 2008089522 A1 7/2008

OTHER PUBLICATIONS

Gerry Blackwell, "Jajah: Free VoIP with a Twist," www.voipplanet.com (Oct. 5, 2006).
(Continued)

*Primary Examiner* — John Pezzlo
(74) *Attorney, Agent, or Firm* — Crawford Maunu PLLC

(57) ABSTRACT

Apparatus and methods concerning simulation of call quality are disclosed. In an example embodiment, computing server is communicatively coupled to a server. The computing server is configured to receive a first set of data which may include audio of a call routed by the server. The computing server also includes a processing circuit configured to characterize a post-transmission quality state of the first set of data. The processing circuit is also configured to generate a second set of data including audio that is different from the audio of the call and data including characteristics indicative of the post-transmission quality state of a first set of data. The processing circuitry may configured to use the second set of data to provide security, protect the confidentiality and privacy, and/or monitor changes of behavior/quality for different audio CODECs, encryption, bit-rate, etc.

21 Claims, 6 Drawing Sheets

Related U.S. Application Data continuation of application No. 15/908,385, filed on Feb. 28, 2018, now Pat. No. 10,334,469, which is a continuation of application No. 15/072,509, filed on Mar. 17, 2016, now Pat. No. 9,924,404.

(51) Int. Cl.
*H04W 24/06* (2009.01)
*H04M 1/253* (2006.01)
*H04L 1/00* (2006.01)
*H04L 65/1069* (2022.01)
*H04L 65/403* (2022.01)
*H04L 65/80* (2022.01)
*H04L 1/20* (2006.01)
*H04W 12/02* (2009.01)
*H04L 65/70* (2022.01)
*H04J 1/16* (2006.01)
*H04L 47/38* (2022.01)

(56) References Cited

U.S. PATENT DOCUMENTS

| | | | |
|---|---|---|---|
| 7,212,516 B1 | 5/2007 | O'Sullivivan et al. | |
| 7,647,041 B2 | 1/2010 | Gonsalves et al. | |
| 8,218,736 B1 | 7/2012 | McClintock et al. | |
| 8,300,634 B2 | 10/2012 | Narayanaswamy | |
| 8,731,907 B2 | 5/2014 | Cheng | |
| 9,432,519 B1 | 8/2016 | Liu et al. | |
| 9,924,404 B1 | 3/2018 | Salour et al. | |
| 10,236,006 B1 | 3/2019 | Gurijala et al. | |
| 11,394,436 B2 * | 7/2022 | Forenza | H04B 7/024 |
| 2004/0034492 A1 * | 2/2004 | Conway | H04L 43/16 |
| | | | 702/81 |
| 2006/0224392 A1 | 10/2006 | Kershaw | |
| 2007/0071206 A1 | 3/2007 | Gainsboro et al. | |
| 2007/0248022 A1 | 10/2007 | Kumar et al. | |
| 2008/0118041 A1 | 5/2008 | Finogenov | |
| 2009/0028161 A1 | 1/2009 | Fullarton et al. | |
| 2009/0221265 A1 | 9/2009 | Liu et al. | |
| 2010/0197288 A1 | 8/2010 | Camilleri et al. | |
| 2011/0137774 A1 | 6/2011 | Jakilinki et al. | |
| 2011/0154443 A1 | 6/2011 | Thakur et al. | |
| 2011/0299673 A1 | 12/2011 | Mello et al. | |
| 2011/0313765 A1 | 12/2011 | Tranquart | |
| 2012/0155455 A1 | 6/2012 | Russell et al. | |
| 2012/0206557 A1 | 8/2012 | Ridges et al. | |
| 2013/0197908 A1 | 8/2013 | Zhong | |
| 2014/0105379 A1 | 4/2014 | Kulkarni | |
| 2016/0057676 A1 | 2/2016 | White et al. | |
| 2018/0121601 A1 | 5/2018 | Hahm et al. | |
| 2023/0093190 A1 * | 3/2023 | Ramachandran | H04L 67/141 |

OTHER PUBLICATIONS

Jeff Goldman, "TalkPlus: a PBX for Mobil Phones," www.voipplanet.com (Aug. 16, 2007).

* cited by examiner

APPROACHES FOR EVALUATING CALL QUALITY

OVERVIEW

The instant disclosure relates generally to communication systems and, more particularly, to telephone services as used in the communications industry. The communications industry continues to rely upon advances in technology to realize higher-functioning systems at cost-effective prices. Telephony signals can now be transmitted by methods and systems including traditional public standard telephone networks (PSTNs), Internet telephony service providers (ITSP), packet-based systems, digital wireless systems, analog wireless systems, private branch exchanges (PBX), cable systems, T1 systems, integrated service digital networks (ISDN), and digital subscriber line (DSL) systems, to name a few.

SUMMARY

Various example embodiments are directed to issues such as those addressed above and/or others which may become apparent from the following disclosure concerning simulating quality of media payload in a set of data based on a post-transmission state of the data.

In certain example embodiments, a post-transmission state of a first set of communication data including a first set of media payload (e.g., private audio and/or video content) is characterized. A second set of communication data is generated that includes a second set of media payload (e.g., non-private audio and/or video content) and includes the characteristics specified by the post-transmission state of the first set of communication data. By including characteristics specified by the post-transmission state in the second set of communication data, the second set of media payload simulates a quality of the first set of media payload. Using the second set of media payload, quality of the first set of media payload can be evaluated without violating privacy of the first set of media payload.

In a more specific example embodiment, an apparatus includes a computing server communicatively coupled to a server configured to route calls for a plurality of endpoints. The computing server includes a communication circuit (e.g., a network interface circuit) configured and arranged to receive a first set of data including audio of a private call routed by the server. The computing server also includes a processing circuit configured to simulate audio quality of the call by characterizing a post-transmission quality state of the first set of data and generating a second set of data including audio that is different from the audio of the call and including characteristics indicative of the post-transmission quality state of a first set of data.

In another specific example embodiment, calls are routed by a server for a plurality of endpoints in a network. Using a communication circuit communicatively coupled to the server, a first set of data is received from the server. The first set of data includes audio of a private call routed by the server. Using a processing circuit, a post-transmission quality state of the first set of data is characterized and a second set of data is generated. The second set of data includes audio that is different from the audio of the private call and includes characteristics indicative of the post-transmission quality state of a first set of data.

The above discussion/summary is not intended to describe each embodiment or every implementation of the present disclosure. The figures and detailed description that follow also exemplify various embodiments.

BRIEF DESCRIPTION OF FIGURES

Various example embodiments may be more completely understood in consideration of the following detailed description in connection with the accompanying drawings, in which.

Figure 1:
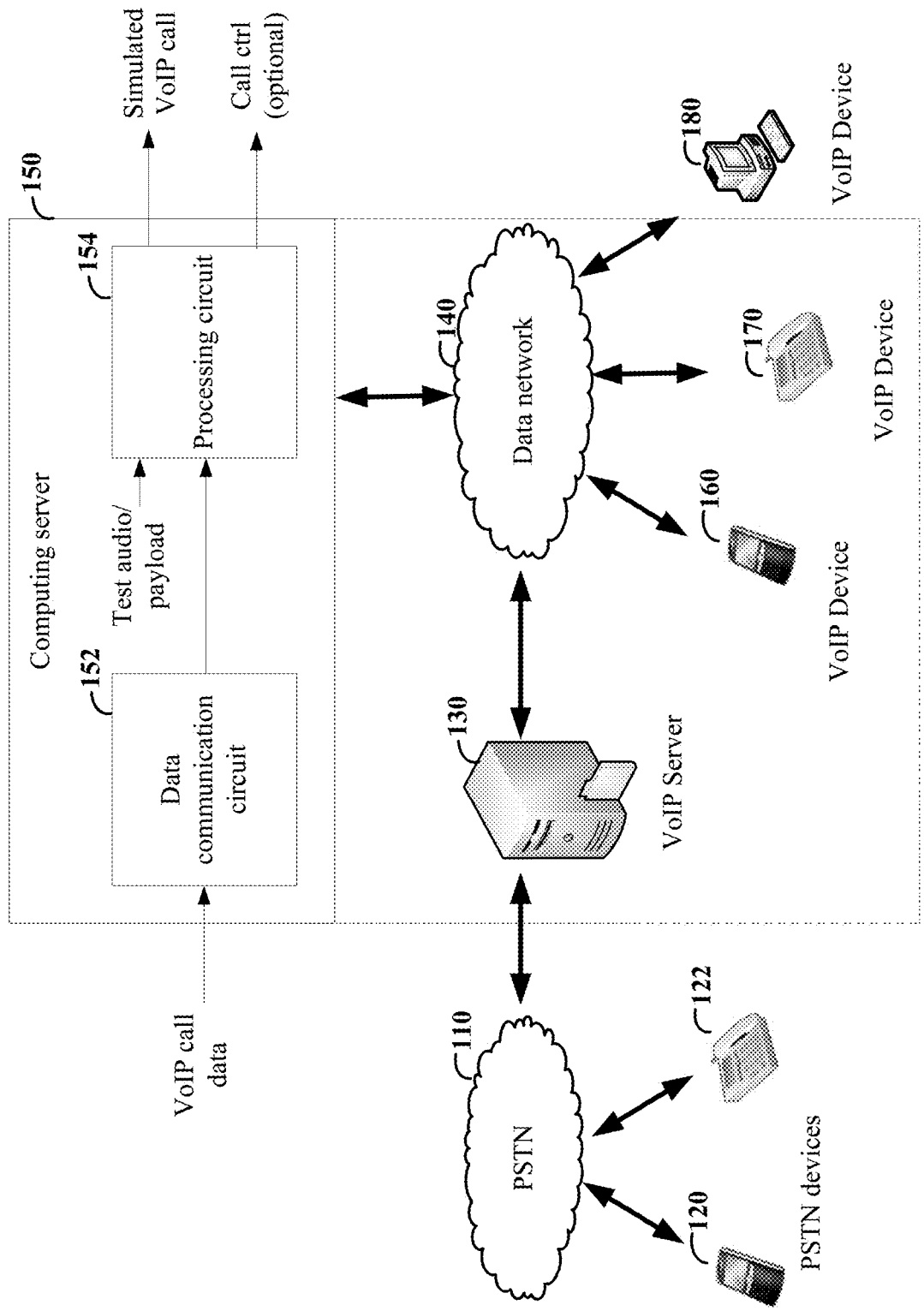
FIG. 1 shows a communication network, configured in accordance with one or more embodiments.

While various embodiments discussed herein are amenable to modifications and alternative forms, aspects thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

DETAILED DESCRIPTION

Aspects of the present disclosure are believed to be applicable to a variety of different types of apparatuses, including systems and/or devices, and methods involving communication services. Some example embodiments are directed to apparatuses and methods for simulating and/or evaluating quality of media payload communicated by a set of data based on a post-transmission state of the set of data. In some embodiments, quality of audio payload in VoIP data packets is simulated and/or evaluated. While not necessarily so limited, various aspects may be appreciated through the following discussion of non-limiting examples which use exemplary contexts.

In some embodiments, a post-transmission state of a first set of VoIP data packets or a VoIP call is determined. The post-transmission quality state may specify various characteristics of the communication data that are indicative of channel conditions (e.g., latency, bandwidth, noise, and/or bit-error-rate) of a communication channel used to transmit the communication data. Characteristics specified by the post-transmission state may include, for example, dropped packets, out of order packets, and/or number and/or locations of bit errors.

A set of simulated VoIP data packets are generated that includes a set of test audio as payload and includes the characteristics specified by the post-transmission state of the first set of communication data. By including characteristics specified by the post-transmission state in the simulated data packets, the test audio included in the payload approximates a quality of the audio in the VoIP call. Using the audio in the simulated VoIP data packets, quality of the first set of media payload can be evaluated without violating privacy of the first set of media payload. In certain embodiments, the above-discussed simulated data packets may be used to monitor (or listen to) the quality of the calls where the audio is end-to-end encrypted, where the payload cannot be decrypted by the provider. In certain embodiments, the above-discussed processing circuit may be configured and arranged to monitor (or listen to) the quality of the calls where the audio is end-to-end encrypted, where the payload cannot be decrypted by the provider.

Accordingly, in the following description various specific details are set forth to describe specific examples presented herein. It should be apparent to one skilled in the art, however, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element. Also, although aspects and features may in some cases be described in individual figures, it will be appreciated that features from one figure can be combined with features of another figure even though the combination is not explicitly shown or explicitly described as a combination.

Different embodiments may employ various circuits and/or processes to simulate and/or evaluate an audio quality of a VoIP call routed by the VoIP server. In some embodiments, a communication circuit is configured to receive call data for the VoIP call. The communication circuit may be implemented using, for example, a network interface circuit configured to communicate data over a data network according to a communication protocol (e.g., Ethernet, WiFi, CDMA, GSM, Bluetooth, ZWave, Zigbee and/or various other IEEE 802.X protocols).

A processing circuit configured to simulate audio quality of the VoIP call. In simulating the audio quality of the VoIP call, the processing circuit determines a post-transmission quality state of VoIP data packets of the VoIP call based on the received VoIP call data. Post-transmission quality state may be determined by evaluating the VoIP call data for a number of characteristics including, for example, dropped packets, out of order packets, number and/or location of bit errors, bit error rate, header metadata, jitter, or various combinations thereof. As an illustrative example, post-transmission quality state may be determined by: 1) examining headers of the data packets to identify dropped and out of order data packets; 2) examining error detection and/or correction data to identify data packets in error; 3) performing forward-error-correction (FEC) to identify a number and/or locations of errors in each of the data packets in error; and 4) examining time stamp data to determine jitter and/or latency of the received data packets. Other evaluation processes that may be used to determine the post-transmission quality state may include various other operations in addition to or in lieu of the operations indicated in the illustrative example. For example, in some applications, data packets may not include error detection/correction data. In such applications, an evaluation process may not attempt to identify errors in the data packets.

The processing circuit also generates a set of simulated VoIP data packets having an encoded set of test audio as payload. The simulated VoIP data packets include characteristics of the post-transmission quality state of the actual data packets. Due to the included characteristics of post-transmission quality state, audio payload in the simulated VoIP data packets exhibits a quality that approximates a quality of the audio payload in VoIP data packets of the VoIP call.

Simulated VoIP data packets may be generated using various processes. For example, in some embodiments, simulated VoIP data packets may be generated by: 1) encoding test audio payload data using an audio codec; 2) inserting the encoded audio payload into new packet headers for from data packets; and 3) inserting characteristics of the determined post-transmission quality state into the data packets (e.g., dropping/reordering data packets, inserting errors, and/or setting timestamps). As another example, in some embodiments, the generation of simulated VoIP data packets may reuse packet header of the original data packets. For instance, the packet generation process may include: 1) encoding test audio payload data using an audio codec; 2) dropping portions of the encoded payload corresponding to dropped data packets, 3) reordering the encoded payload according to the ordering of the original data packets, 4) replaying payload in the data packets with the encoded payload; and 5) inserting errors in the resulting data packets. Some processes for generating simulated VoIP data packets may include various other operations in addition to or in lieu of the operations indicated in the above examples. For instance, in some embodiments, FEC data may be added to the payload data to simulate recovery from the errors inserted into the data packets.

In some embodiments, the processing circuit is further configured to process the simulated VoIP data packets using a post-transmission to produce simulated audio having a quality that approximates quality of the VoIP call. The post-transmission process may include operations that are typically performed by a receiving endpoint. The simulated VoIP data packets may be generated using various post-transmission processes. As one example, in some embodiments the post-transmission process may generate audio by: 1) performing FEC to correct errors in the simulated VoIP data packets; 2) decrypting payload data in the simulated VoIP data packets; and 3) decoding payload data in the simulated VoIP data packets according to an audio codec to generate the simulated audio. Other possible post-transmission processes that may be used to generate the simulated audio may include various other operations in addition to or in lieu of the operations indicated in the above example.

In some embodiments, the processing circuit is configured to generate a second set of simulated VoIP data packets. The second set of simulated VoIP data packets include test audio payload encoded with a codec different than that used for the actual VoIP call. Quality of the audio in the second set of simulated VoIP data packets may be determined. The determined quality approximates a quality that would be expected to be exhibited if the second codec had been used for the actual VoIP call.

In some embodiments, simulated VoIP data packets may be generated and evaluated for several different sets of communication settings to determine which set of communication settings provides the best call quality. Communication settings may include for example bitrate, audio codec, FEC coding, packets size, and/or encryption options. In some embodiments, the apparatus may include a circuit configured to dynamically adjust communication settings for VoIP calls based on the determined quality while the VoIP calls are ongoing.

In some embodiments, communication settings are set according to a selection algorithm specified in a configuration settings file stored locally or in a remote database. The selection algorithm may select communication settings based on various criteria in addition to or in lieu of the determined call quality including, for example, device compatibility, network traffic characteristics, number and location of call participants, network traffic characteristics, date, and/or time. In some embodiments, communication settings may be dynamically adjusted for ongoing VoIP calls based on a determined audio quality.

In some embodiments, the processing circuit is configured to determine call data metrics for VoIP calls routed by a VoIP server. The call data metrics may be determined, for example, by generating various statistics relating to the quality of the VoIP calls including, for example, one or more quality metrics (e.g., voice quality evaluation and/or BER), determinations, communication settings for the VoIP call (e.g., codec, FEC, encryption, and/or packet size), number and/or location of call participants, data path(s) used for routing of the VoIP call, network characteristics of the data path(s) (e.g., bandwidth, latency, dropped data packets, and/or BER), time of the VoIP call, date of the VoIP call), or various combinations thereof. The processing circuit may be configured to generate reports indicating call data metrics for individual calls, or aggregate data for a plurality of calls.

In some embodiments, the processing circuit is configured to perform an analysis of the call data metrics. For instance, processing circuit may evaluate the generated call data metrics for a parameter of interest specified in an input query. The input query may request that the processing circuit analyze the call data metrics for various parameters of interest. Parameters of interest may include, for example, identifiers for specific ones of the data metrics and/or criteria for identifying subsets of the data metrics.

As an illustrative example, an input query may request that the processing circuit filter call data metrics to identify metrics common to calls having determined audio quality that is below a threshold specified in the query. After identifying the common metrics, the values may be used as a signature to identify similar calls as they occur. This process may be useful, for example, to determine a signature for detection of calls that are likely exhibiting poor call quality. As yet another example parameter of interest, the input query may request to evaluate call quality of calls services by a data center, for example, to identify call agents for which a call quality that deviate from that average call quality for all call agents. Such deviation may be indicative of a call agent using incorrectly functioning call equipment.

As yet another example parameter of interest, the input query may request that a processing circuit identify call data metrics that are exhibiting a recent call quality trend in comparison to a historical average value. Trends may be identified, for instance, based on deviation of call quality in a recent time window from an average calculated from the previous time window. In some implementations, the analysis process may further evaluate identified trends to identify other metrics that exhibit a strong correlation with the identified trend. In some embodiments, a processing circuit is configured to correlate call data metrics with data provided from other sources to facilitate further analysis. Other data sources may include, for example, applications utilized by the end-users in the network, internet-connected data repositories, and/or third-party data subscription services. As one example, a presence (or activity) detection circuit may provide data indicating statuses of the end-users to the processing circuit.

In some embodiments, the processing circuit may be configured to provide alert messages to one or more users in response to the generated call data metrics satisfying a set of alert criteria. For example, in some embodiments, the processing circuit is configured to provide alert messages to one or more users in real-time during an ongoing call in response to the set of criteria being satisfied. In some implementations, the alert messages may include a mechanism for a recipient to select one or more actions to be performed. For instance, the alert message can be a screen popup window that includes clickable options, for example, to adjust different communication settings, perform various remedial options, and/or flag the issue for follow-up and/or further analysis.

In some embodiments, the processing circuit may be configured to provide a graphical user interface (GUI), e.g., a webpage interface, including a mechanism (e.g., button(s), selection menu(s), and/or slider(s)) for the user to define/adjust selection criteria used by a settings selection algorithm for selection of communication settings for VoIP calls, alert criteria, and/or other settings of the processing circuit. In some embodiments, the settings selection algorithm and/or alert criteria may be implemented using a machine learning algorithm (e.g., an evolutionary algorithm). The machine learning algorithm may be evaluated and adjusted in a training process to improve performance and/or accuracy of the algorithm. Training may include supervised learning, unsupervised learning, or a combination thereof to improve the algorithm over time. For example, a settings selection algorithm may be adjusted to use a different weighting of parameters on a trial basis. If the modified settings selection algorithm improves simulated and/or actual call quality the modified settings selection algorithm may replace the current settings selection algorithm. Otherwise, the modified settings selection algorithm may be discarded.

The disclosed embodiments may be adapted for simulation and evaluation of quality of various types of bi-directional communication applications (e.g., VoIP calls, video conferences) and/or uni-directional communication, audio and/or video media streaming services. For example, some VoIP servers and/or applications may provide a mechanism for call participants to record audio of a call or conference for later access and review. Quality of the recorded audio may be simulated and/or evaluated, as discussed with reference to VoIP call. Based on a determined quality of the recorded audio, one or more settings for may be adjusted to improve the quality of the recording or future recordings. For example, when merging audio of conference participants, audio of one or more participants may be delayed or advance relative to that of other participant to mitigate effects of latency. For instance, audio of a participant that was connected via high-latency connection may have exhibited noticeable delay during the conference. When merging audio of to produce a recording of the conference, the audio of the participant may be advanced to reduce the amount of delay. For ease of explanation, the examples are primarily described with reference to simulating quality of VoIP calls.

Turning now to the figures, FIG. 1 shows a communication network, configured in accordance with one or more embodiments. The communication network includes a VoIP server 130, configured to route calls for a plurality of communication devices 160, 170, and 180 of a user connected to a data network 140. The VoIP server 130 is configured to route VoIP calls between devices (e.g., 120 and 122) connected in a PSTN 110 and the plurality of communication devices 160, 170, and 180.

A computing server 150 includes a communication circuit 152 configured to receive call data for the VoIP call. The call data may include, for example, complete VoIP data packets, packet headers, and/or metadata indicating post-transmission characteristics and/or characteristics of a communication channel used to route the first set of VoIP data packets. The metadata may be received for example, from endpoints devices (e.g., 160, 170, and 180) of call participants and/or communication nodes that route VoIP data packets for the call (e.g., VoIP server 130 or nodes in data network 140). The computing server 150 includes a processing circuit 154 configured to simulate an audio quality of a VoIP call routed by the VoIP server. In simulating the audio quality of the VoIP call the processing circuit 154, determines a post-transmission quality state of the actual data packets and generates a set of simulated VoIP data packets having an encoded set of test audio as payload. The simulated VoIP data packets include characteristics of the post-transmission quality state of the actual data packets. The processing circuit 154 is configured to process the VoIP data packets (e.g., using FEC, decryption, and/or codec decoding) to produce a set of audio. Due to the characteristics of the post-transmission quality state in the second set of VoIP data packets, the quality of the generated audio approximates quality of the audio of the actual VoIP call. Accordingly, the generated audio may be listed to or evaluated with other techniques to determine quality of the VoIP call without violating privacy of call participants.

In this example, the computing server 150 is shown as a stand-alone device communicatively connected to the VoIP server 130 via data network 140. However, the embodiments are not so limited. As depicted by the dashed line in FIG. 1, in some embodiments, the VoIP server 130, a communication node in the data network 140, an endpoint device (e.g., 160, 170, or 180), or various combinations thereof may be incorporated into the computing server 150. For example, the VoIP server 130 and the computing server 150 may be implemented by respective processes on the same computing system.

Figure 2:
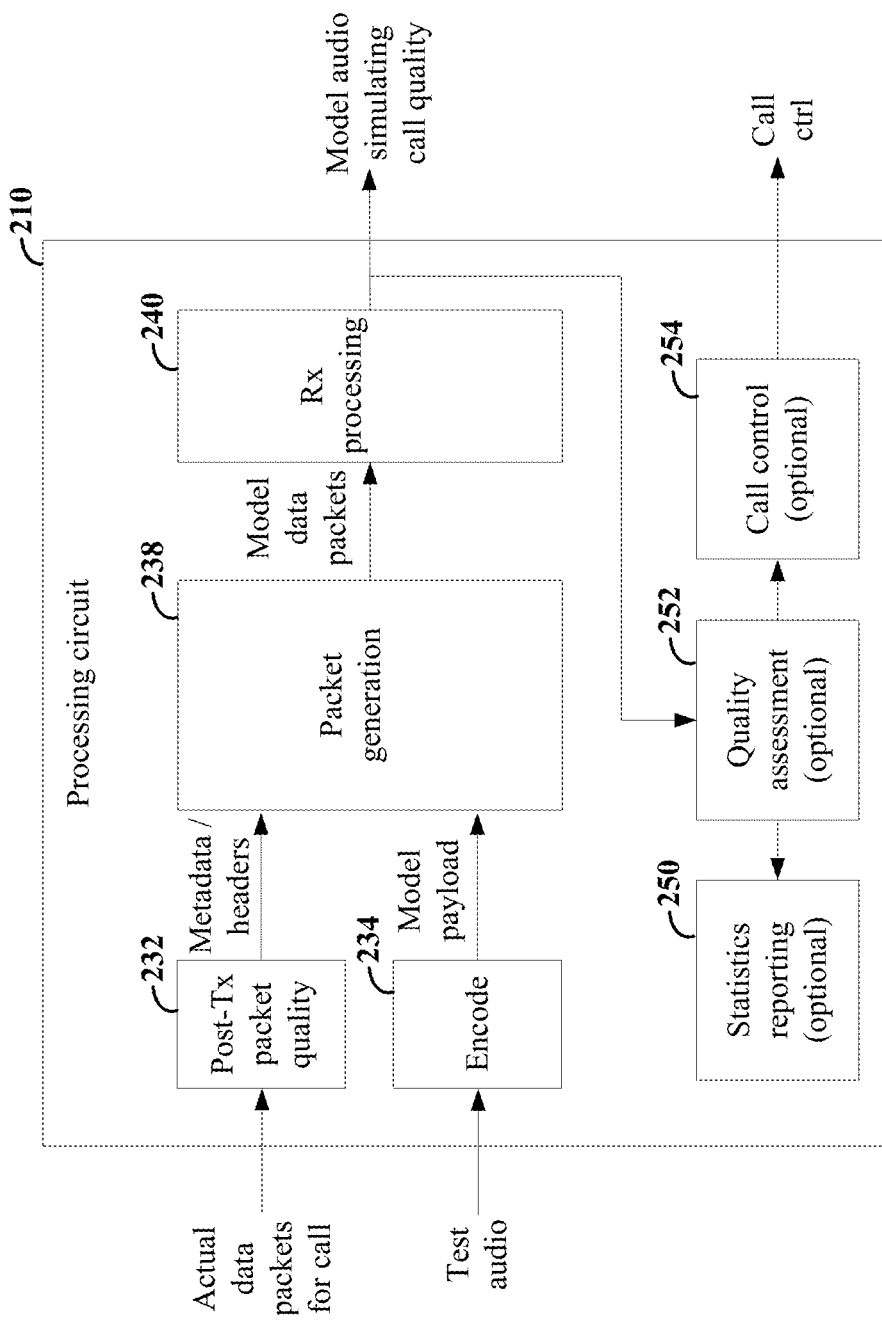
FIG. 2 shows an example processing circuit for simulating of call quality of a private VoIP call, in accordance with one or more embodiments.

FIG. 2 shows an example processing circuit for simulating of call quality of a private VoIP call, in accordance with one or more embodiments. The processing circuit 210 may be used, for example, to implement processing circuit 154 in FIG. 1. In this example, the processing circuit 210 includes a circuit 232 configured to generate a set of data (e.g., metadata and headers) characterizing a post-transmission quality of a set of data packets for a VoIP call. An encode circuit 234 encodes a set of test audio (e.g., according to an audio codec to produce a set of model payload.

Packet generation circuit 238 is configured to generate a set of model data packets including the model payload. In some embodiments, the model data packets may be generated by inserting the model payload into the headers of the actual data packets. Alternatively one or more data packets may be generated by inserting model payload data into a model set of headers. The packet generation circuit 238 is also configured to modify the generated model data packets to include characteristics consistent with the post-transmission state of the actual data packets. For example, the packet generation circuit 238 may reorder and/or delete certain ones of the generated data packets to replicate dropped/out-of-order packets in the actual data packets for the call. As another example, the packet generation circuit 238 may insert bit errors in one or more data packets by inverting bits of the model data packets. Errors may be inserted at particular locations (e.g., specified by the metadata), or at pseudorandom positions consistent with a bit-error-rate specified by the metadata. By reordering/deleting packets and/or inserting errors, the model data packets are made to resemble the post-transmission state of the actual data packets.

A receiver processing circuit 240 is configured to process the simulated data packets in the manner that the actual data packets would be processed by a receiving end-point. Processing may include, for example, decryption, forward-error-correction, and/or payload decoding to produce a second set of test audio. Since the model data packets are made to resemble the post-transmission state of the actual data packets, the second set of test audio produced by the receiver processing circuit 240 simulates a call quality experienced by a call participant that received the actual data packets.

In some applications, a quality control technician may manually listen to the generated second set of audio to evaluate the quality of the actual call without violating privacy of the call participants. Alternatively or additionally, the processing circuit 210 may include a quality assessment circuit 252 configured to determine a quality of the model audio. The quality of the model audio may be determined, for example, based on a difference between the model audio and the original test audio. The differences may be assessed to determine call quality using various assessment algorithms including, for example, the PSQM (Perceptual Speech Quality Measure) algorithm defined in International Telecommunication Union (ITU) Recommendation ITU-T P.861 and/or the PESQ (Perceptual Evaluation of Speech Quality) algorithm defined in ITU recommendation ITU-T P.862.

In some embodiments, the processing circuit 210 may be configured to perform various actions based on the determined quality of the model audio. In this example, the processing circuit 210 includes a call control circuit 254 configured to adjust communication settings based on the determined quality of the model audio. For instance, the call control circuit 254 may direct a VoIP server and/or endpoint devices to use, for example, a particular audio codec, encryption coding, forward-error-correction coding, and/or packet size for VoIP calls. As previously described, in some embodiments, the call control circuit 254 selects the communication settings according to a selection algorithm specified in a configuration settings file. The communication settings file may be stored locally in the processing circuit 210 or in a database communicatively connected to the processing circuit 210. The selection algorithm may select communication settings based on various criteria in addition to or in lieu of the determined call quality including, for example, device compatibility, network traffic characteristics, number and locations of call participants, network traffic characteristics, date, and/or time. In some embodiments, the selection algorithm may select communications settings based on call quality of an individual call or based on aggregate call quality data acquired from multiple calls occurring within a recent time window. Call quality data may be aggregated from calls occurring within a window of minutes, hours, days, weeks, months, or even years.

In some embodiments, the call control circuit 254 is configured to dynamically adjust communication settings for an ongoing call based on a determined quality of model audio simulated quality of the ongoing call. In some embodiments, the processing circuit 254 is configured to generate model audio that simulates a call quality that would be expected if the data packets for a private call had been communicated using one or more different sets of communication settings. If a new set of communication settings improves call quality, the call control circuit 254 may prompt the VoIP server and/or endpoint devices of call participants to seamlessly switch to the new set of communication settings without interruption of the call. Different embodiments may communicate the new communication settings to a VoIP server and/or endpoint devices using various messages/signals including, for example, modified session initiation protocol (SIP) command messages (e.g., INFO, NOTIFY, and/or OPTIONS).

In some embodiments, the processing circuit 210 may include a statistics reporting circuit 250 configured to record call data metrics for VoIP calls routed by a VoIP server. The call data metrics recorded for a VoIP call may indicate various statistics characterizing the quality of the call including, for example, one or more quality metrics (e.g., voice quality evaluation and/or BER), determinations, communication settings for the VoIP call (e.g., codec, FEC, encryption, and/or packet size), number and/or location of call participants, data path(s) used for routing of the VoIP call, network characteristics of the data path(s) (e.g., bandwidth, latency, dropped data packets, and/or BER), time of the VoIP call, date of the VoIP call), or various combinations thereof. In some embodiments, the statistics reporting circuit 250 is configured to generate reports indicating call data metrics for individual calls, or aggregate data for a plurality of calls. Call data metrics may be aggregated for a plurality of calls to/from end-users in specific departments and/or geographic regions, routed via specific communication paths and/or networks. In some embodiments, the cumulative call data metrics may aggregate call data metrics for calls occurring over various time periods including, for example, minutes, hours, days, weeks, months, or years. In some implementations of the statistics reporting circuit 250, cumulative call data metrics may be updated in real time as quality is determined for new calls.

In some embodiments, the statistics reporting circuit may be configured to provide alert messages to one or more users in response to the call data metrics satisfying a set of alert criteria. As an illustrative example, an alert may be provided to an IT specialist when the determined call quality of a VoIP call falls below a threshold value specified by the alert criteria. As another example, an alert may be provided to a network manager of a data network if the call data metrics indicates there is a connectivity problem in the data network. As yet another example, an alert may be provided to an IT specialist or end-user if quality the processing circuit 210 determines that a different set of communication settings provide better call quality. In some implementations, the alert messages may include a mechanism for a recipient to select one or more actions to be performed. For instance, the alert can be a screen popup window that includes clickable options, for example, to adjust different communication settings, perform various remedial options, and/or flag the issue for follow-up and/or further analysis.

Figure 3:
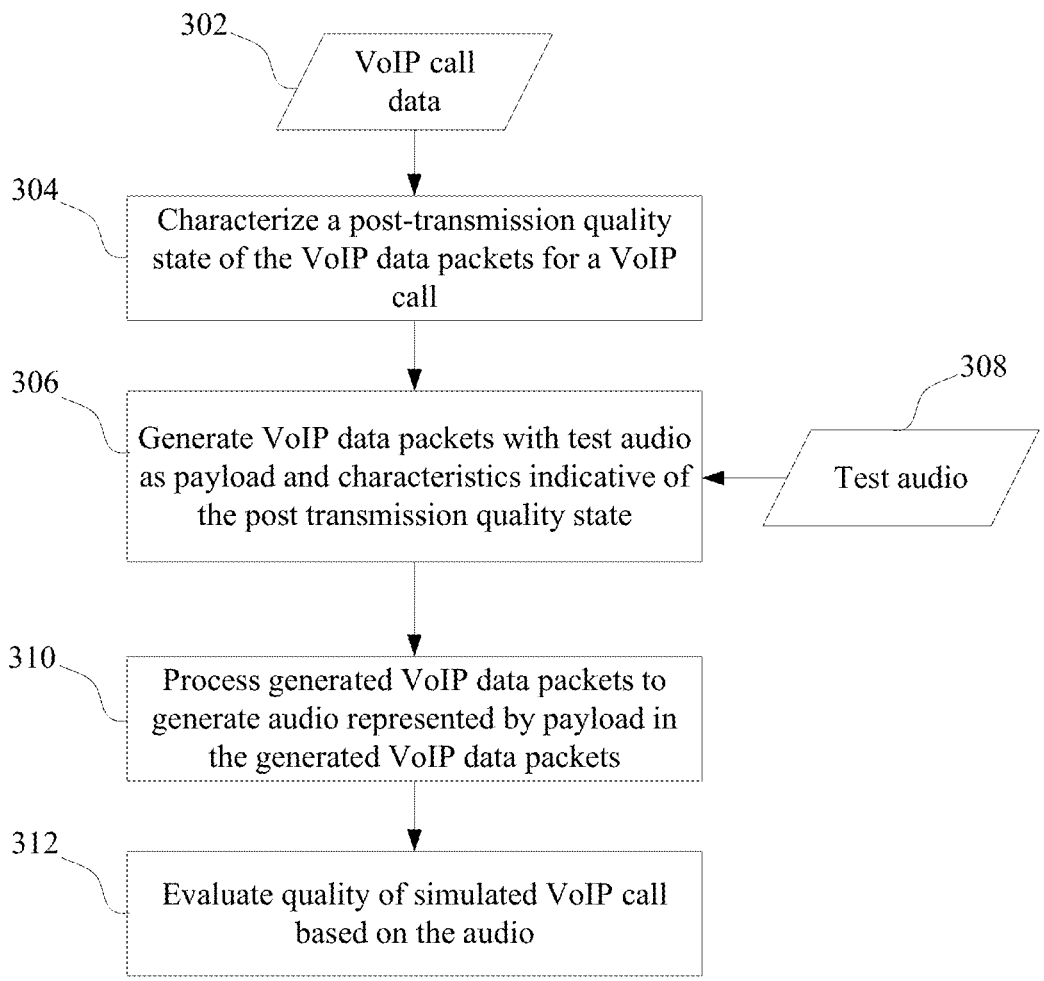
FIG. 3 shows an example process for evaluating call quality of a private VoIP call, in accordance with one or more embodiments.

FIG. 3 shows an example process for evaluating call quality of a private VoIP call, in accordance with one or more embodiments. The process is initiated when a set of VoIP call data 302 is received (e.g., by computing server 150). The VoIP call data 302 may include, for example, a first set of VoIP data packets for a VoIP call, headers of the VoIP data packets without payload, and/or metadata indicating post-transmission characteristics and/or characteristics of a communication channel used to route the first set of VoIP data packets. The metadata may be received for example, from endpoints devices of call participants and/or communication nodes that route VoIP data packets for the call. At block 304, post-transmission quality state of the first set of VoIP data packets for the VoIP call is characterized from the VoIP call data 302 (e.g., by circuit 232). At block 306, a second set of VoIP data packets are generated (e.g., by circuits 234 and 238). The second set of VoIP data packets include test audio 308 as payload and has characteristics of the post-transmission quality state of the first set of VoIP data packets. At block 310, the second set of VoIP data packets are processed (e.g., by circuit 240) to generate audio represented by payload in the second set of VoIP data packets. Due to the characteristics of the post-transmission quality state in the second set of VoIP data packets, the quality of the audio generated at block 310 simulates quality of the audio of the VoIP call. At block 312, the generated audio is evaluated to determine a quality of the original VoIP call.

Figure 4:
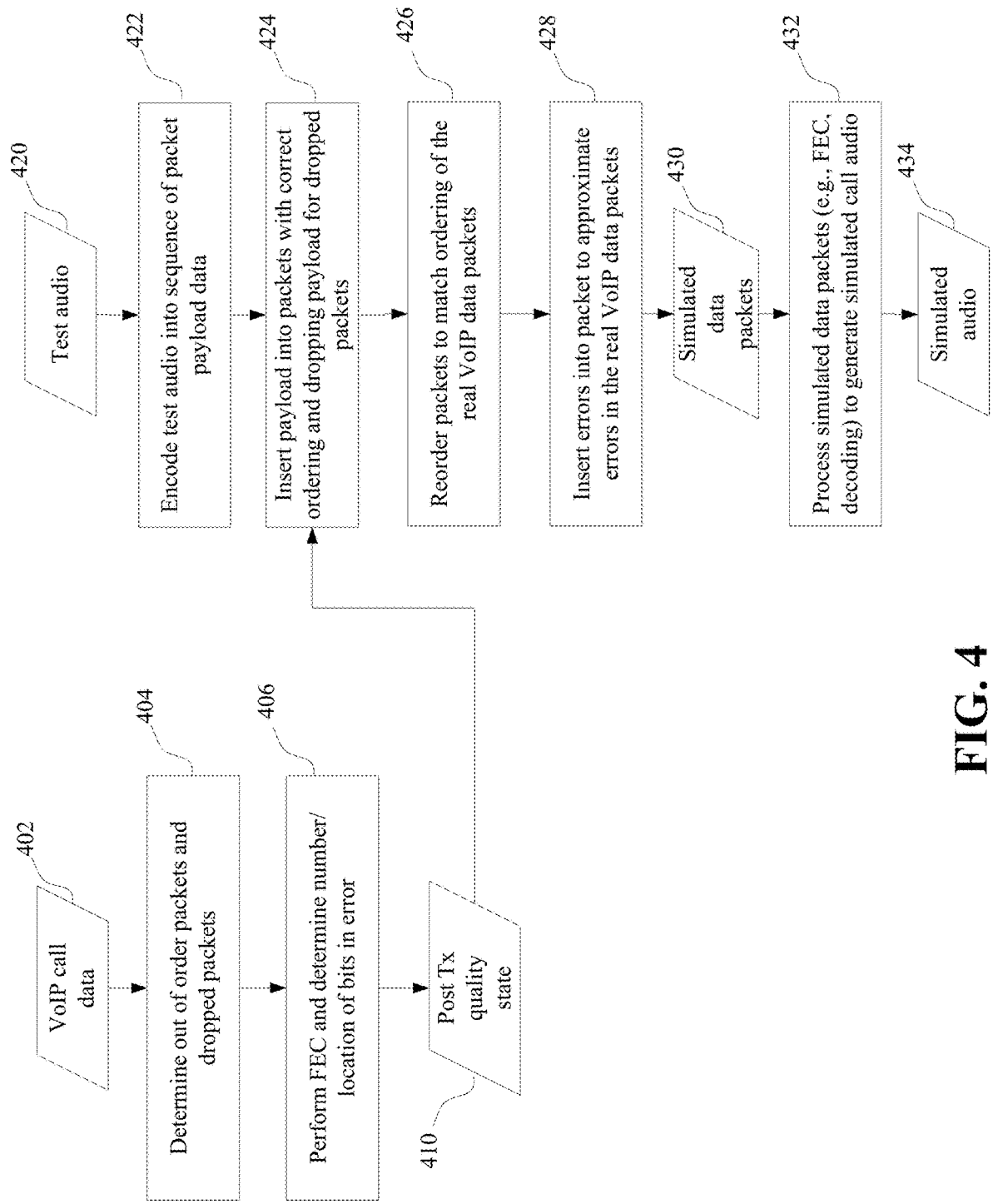
FIG. 4 shows an example process for evaluating call quality of a private VoIP call, in accordance with one or more embodiments.

FIG. 4 shows an example process for evaluating call quality of a private VoIP call, in accordance with one or more embodiments. The process is initiated when a set of VoIP call data 402 is received. As previously described, the VoIP call data 402 may include, for example, a first set of VoIP data packets for a VoIP call, headers of the VoIP data packets without payload, and/or metadata indicating post-transmission characteristics and/or characteristics of a communication channel used to route the first set of VoIP data packets. At blocks 404 and 406 a post-transmission quality state 410 of the first set of VoIP data packets for the VoIP call is determined (e.g., by circuit 232). In this example, dropped and out-of-order packets in the first set of VoIP data packets are determined at block 404. At block 406, FEC is performed to determine number and/or location of bits in error.

At block 422, a set of test audio 420 is encoded (e.g., by circuit 234) to form a sequence of simulated payload data. At block 424, the simulated payload data is inserted into data packets (e.g., by circuit 238) to form a set of simulated data packets with correct ordering. Payload corresponding to dropped packets is discarded at block 424. At block 426, the simulated data packets are reordered (e.g., by circuit 238) to match ordering of the real VoIP data packets for the VoIP call. At block 428, errors are inserted into the simulated data packets (e.g., by circuit 238) to approximate errors in the real VoIP data packets and form a final set of simulated data packets 430. At block 432, the simulated data packets are processed (e.g., by circuit 240) to generate a set of simulated call audio 434. Processing of the audio may include for example, FEC and/or decoding audio data according to the particular codec used for the VoIP call.

Figure 5:
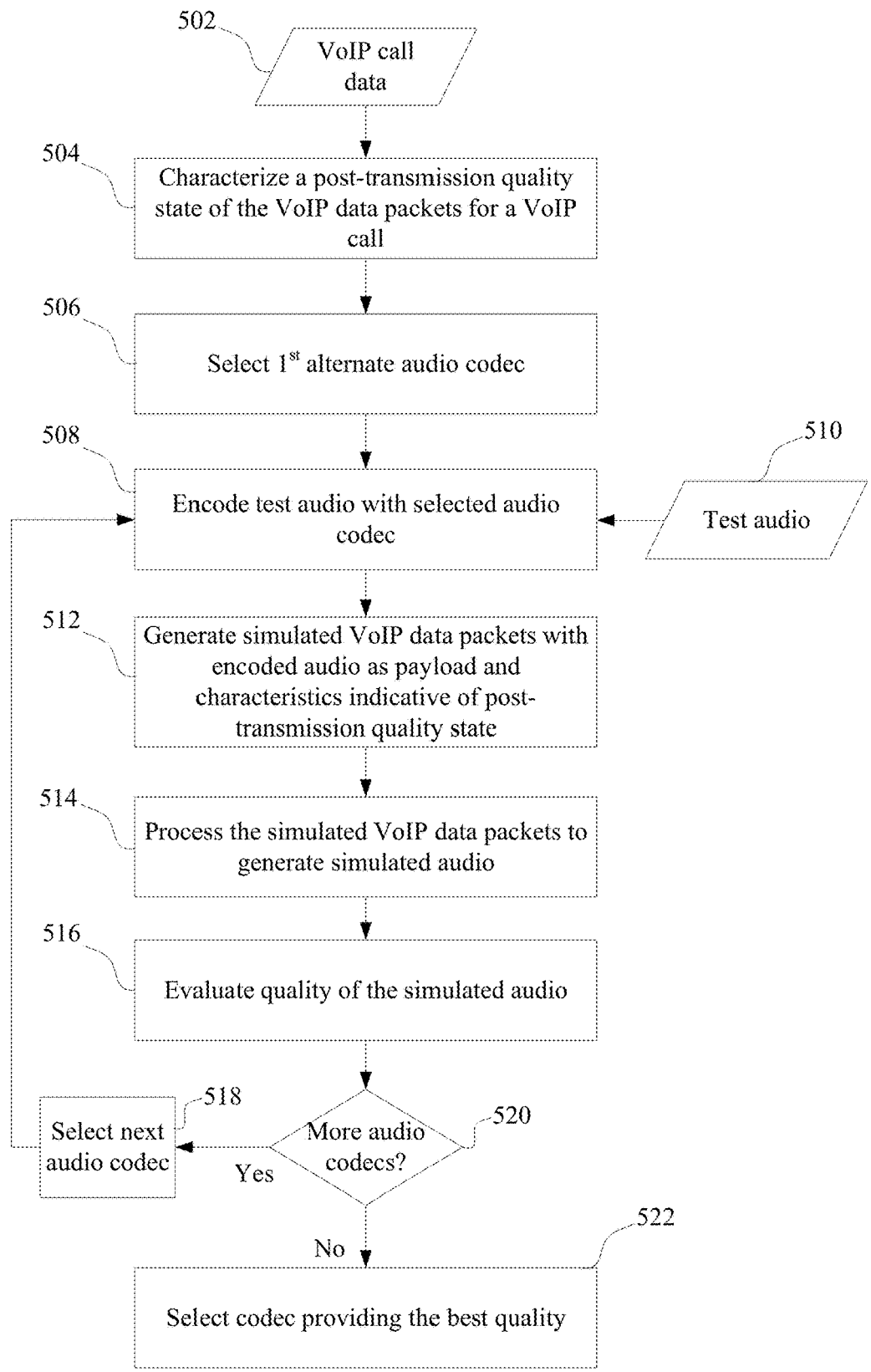
FIG. 5 shows an example process for evaluating call quality of a private VoIP call for a plurality of different VoIP communication settings, in accordance with one or more embodiments.

FIG. 5 shows an example process for evaluating call quality of a private VoIP call for a plurality of different VoIP communication settings, in accordance with one or more embodiments. The process is initiated when a set of VoIP call data 502 is received. At block 504 a post-transmission quality state 410 of the actual VoIP data packets for the VoIP call is determined (e.g., by circuit 232). At block 506, a first alternate audio codec is selected (e.g., by circuit 234). The alternate audio codec is different from the codec used to encode audio in the actual VoIP data packets for the VoIP call. At block 508, a set of test audio 510 is encoded (e.g., by circuit 234). At block 512, a set of simulated VoIP data packets is generated (e.g., by circuit 238) having the encoded audio as payload. The simulated VoIP data packets include characteristics of the post-transmission quality state of the actual data packets. At block 514, the simulated VoIP data packets are processed (e.g., by circuit 240) to generate a set of simulated call audio. At block 516, quality of the simulated audio is evaluated (e.g., by circuit 252). If there are more audio codecs to be evaluated at decision block 520, the next audio codec is selected at block 518. Call quality of a VoIP call using the selected audio coded is simulated at blocks 508, 512, 514, and 516 as previously described. Once there are no more audio codecs to be evaluated at decision block 520, the codec providing the best audio quality is selected (e.g., by circuit 254) for use at block 522.

Figure 6:
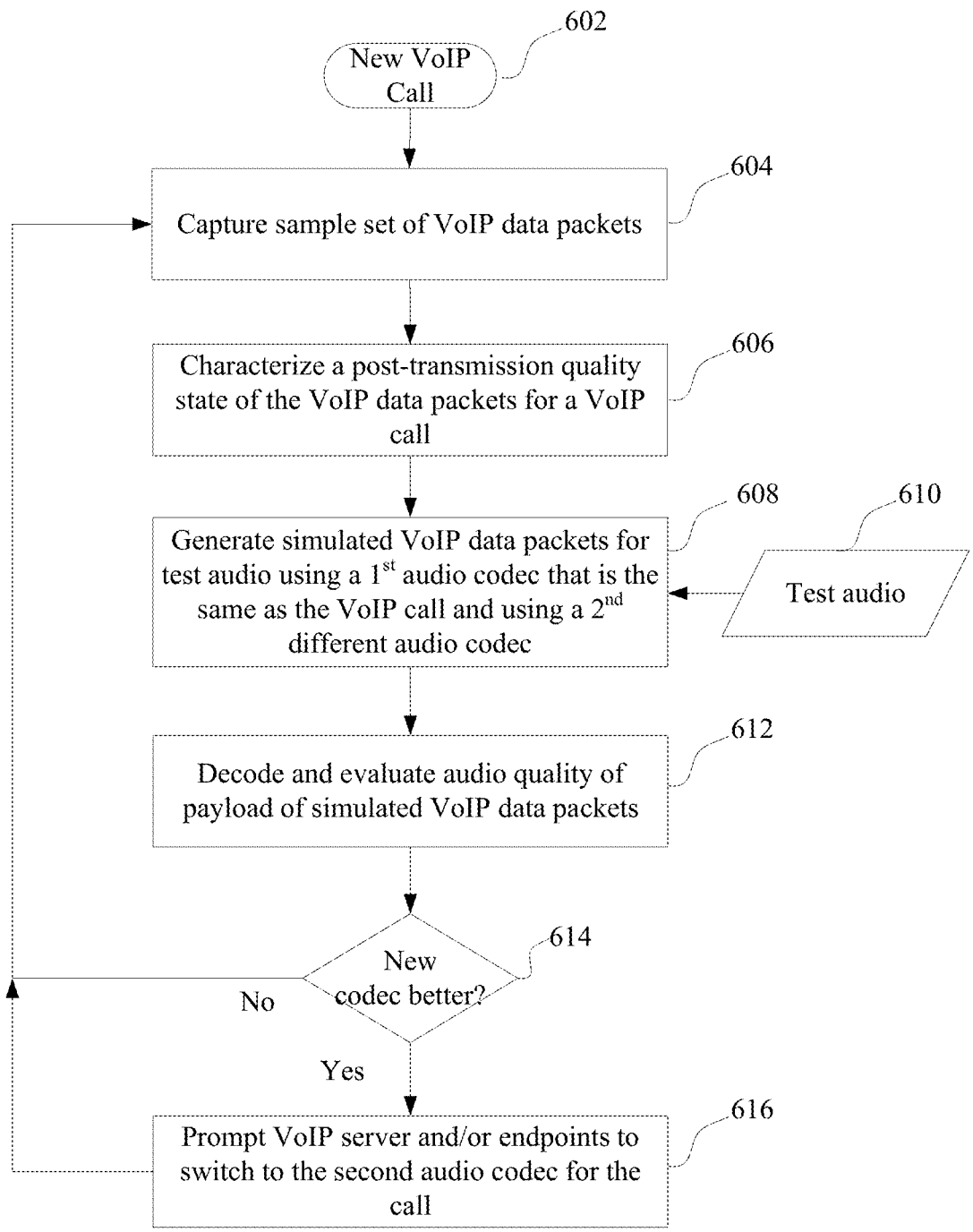
FIG. 6 shows an example process for dynamic selection of VoIP communication settings, in accordance with one or more embodiments.

FIG. 6 shows an example process for dynamic selection of VoIP communication settings during operation, in accordance with one or more embodiments. The process is initiated in response to a new VoIP call 602. At block 604 a sample set of VoIP data packets are captured (e.g., by communication circuit 152, nodes in the communication network such as VoIP server 130, or endpoints 160, 170, 180 in a communication network). Audio payload in the VoIP data packets is encoded in a first audio codec. At block 606, post-transmission quality state of the captured VoIP data packets is determined (e.g., by circuit 232). At block 608, a set of simulated VoIP data packets is generated (e.g., by circuit 238) having the test audio 610 encoded with a second audio codec as payload. The simulated VoIP data packets include characteristics of the post-transmission quality state of the actual data packets. At block 612, payload of the simulated VoIP data packets is decoded and evaluated (e.g., by circuits 240 and 252). If the new audio codec provides better audio quality, at decision block 614, a VoIP server and/or endpoints are prompted (e.g., by circuit 254) to switch to the new audio codec for the call. Following decision block 614 or block 616, the process returns to block 604 and the process is repeated. The process repeats in this manner until the call is ended.

Various blocks, modules or other circuits may be implemented to carry out one or more of the operations and activities described herein and/or shown in the figures. As examples, the Specification describes and/or illustrates aspects useful for implementing the claimed invention by way of various circuits or circuitry using terms such as blocks, modules, device, system, unit, controller, and the like. In these contexts, a "block" (also sometimes "logic circuitry" or "module") is a circuit that carries out one or more of these or related operations/activities (e.g., a call control circuit). For example, in certain ones of the above-discussed embodiments, one or more modules are discrete logic circuits or programmable logic circuits configured and arranged for implementing these operations/activities, as in the blocks shown in the figures. Similarly, it will be apparent that a server (e.g., providing a corresponding software platform) includes a computer processing circuit that is configured to provide services to other circuit-based devices. Moreover, a VoIP endpoint device (or endpoint) is a communication circuit that can include circuits which are configured to establish VoIP communication sessions with other devices (e.g., personal computers, IP-enabled mobile phones, and tablet computers). In certain embodiments, a processing circuit may be implemented using one or more computer circuits programmed to execute a set (or sets) of instructions (and/or configuration data). The instructions (and/or configuration data) can be in the form of firmware or software stored in and accessible from a memory (circuit), and where such circuits are directly associated with one or more algorithms (or processes), the activities pertaining to such algorithms are not limited to the specific flows such as shown in the flow charts illustrated in the figures (e.g., where a circuit is programmed to perform the related steps, functions, operations, activities, etc., the flow charts are merely specific detailed examples). The skilled artisan would also appreciate that different (e.g., first and second) modules can include a combination of a central processing unit (CPU) hardware-based circuitry and a set of computer-executable instructions, in which the first module includes a first CPU hardware circuit with one set of instructions and the second module includes a second CPU hardware circuit with another set of instructions.

Certain embodiments are directed to a computer program product (e.g., nonvolatile memory device), which includes a machine or computer-readable medium having stored thereon, instructions which may be executed by a computer (or other electronic device) to perform these operations/activities. For example, these instructions reflect activities or data flows as may be exemplified in the flow chart. As another example, where the Specification may make reference to a "first [type of structure]", a "second [type of structure]", etc., where the [type of structure] might be replaced with terms such as ["circuit", "circuitry" and others], the adjectives "first" and "second" are not used to connote any description of the structure or to provide any substantive meaning; rather, such adjectives are merely used for English-language antecedence to differentiate one such similarly-named structure from another similarly-named structure (e.g., "first circuit configured to convert . . . " is interpreted as "circuit configured to convert . . . ").

Based upon the above discussion and illustrations, those skilled in the art will readily recognize that various modifications and changes may be made to the various embodiments without strictly following the exemplary embodiments and applications illustrated and described herein. For example, although aspects and features may in some cases be described in individual figures, it will be appreciated that features from one figure can be combined with features of another figure even though the combination is not explicitly shown or explicitly described as a combination. Such modifications do not depart from the true spirit and scope of various aspects of the disclosure, including aspects set forth in the claims.

What is claimed is:

1. An apparatus comprising:
   a data-communications server communicatively coupled to a communication network and configured to receive a first set of data characterizing or representing media payload of a call made over the communication network; and
   a processing circuit, coupled to the data-communications server to:
      characterize a post-transmission quality state of the first set of data;
      form a model data set by generating a second set of data including a characterization or representation of the media payload that is different from the first set of data, the second set of data including characteristics indicative of the post-transmission quality state of a first set of data based on a post-transmission process applied to the first set of data; and
      simulate, in response, quality of the data characterizing or representing the media payload.

2. The apparatus of claim 1, wherein
   the processing circuit is further configured to:
      generate a plurality of sets of data including the second set of data, each of the plurality of sets of data encoding a set of media payload, different from the media payload of the call;
      provide a characterization of media payload quality, respectively, for each of the plurality of sets of data; and
      prompt the data-communications server to encode media payload of the call based on at least one of the plurality of sets of data having a higher quality characterization.

3. The apparatus of claim 2, wherein the processing circuit is further configured to quantify the first set of data characterizing or representing the media payload.

4. The apparatus of claim 1, wherein the call is to be routed by the data-communications server for a connection over the communication network.

5. The apparatus of claim 1, wherein:
the processing circuit is further configured to quantify a media payload quality of the set of media payload data;
the media payload of the call is encoded according to a first codec; and
the processing circuit is further configured to prompt the data-communications server to use a second codec to encode media payload in response to the media payload quality being less than a threshold value.

6. An apparatus comprising:
a data-communications server communicatively coupled to a communication network and configured to receive a first set of data including data characterizing or representing media payload of a call; and
a processing circuit communicatively, coupled to the data-communications server, to:
characterize a post-transmission quality state of the first set of data;
generate a second set of data including media payload that is different from the media payload of the call, the second set of data including characteristics indicative of the post-transmission quality state of a first set of data; and
simulate media payload quality of the call; wherein the second set of data is generated using a set of model payload, a set of data packets including the set of model payload, and wherein the set of data packets is include characteristics indicative of a post-transmission quality state of the first set of data.

7. The apparatus of claim 6, wherein the characteristics indicative of a post-transmission quality state are based in part on a determination of dropped packets in a sequence of packets included in the first set of data.

8. The apparatus of claim 7, wherein the processing circuit is to delete packets from the set of data packets corresponding to positions of the dropped packets in the sequence of packets included in the first set of data.

9. The apparatus of claim 6, wherein the processing circuit is further configured to, in generating the second set of data, identify positions of error bits in the first set of data, and insert bits in the second set of data at the identified positions of bits in error.

10. The apparatus of claim 6, wherein
a characterization of the post-transmission quality state of a first set of data, by the processing circuit, identifies an ordering of a sequence of packets included in the first set of data.

11. The apparatus of claim 10, wherein the set of data packets is modified by the processing circuit for reordering a set of packets in the second set of data according to the identified ordering.

12. The apparatus of claim 11, wherein the processing circuit is further configured to: perform forward-error-correction, demodulation, or combinations thereof, and quantify a media payload quality of the set of media payload data.

13. An apparatus comprising:
a data-communications server communicatively coupled to a communication network and configured to receive a first set of data characterizing or representing video content from a call made over the communication network; and
a processing circuit communicatively coupled to data-communications server and configured to simulate quality of the first set of data characterizing or representing the video content by performing operations including:
characterizing a post-transmission quality state of the first set of data; and
forming a model data set by generating a second set of data including a characterization or representation of the video content that is different from the first set of data, the second set of data including characteristics indicative of the post-transmission quality state of a first set of data based on a post-transmission process applied to the first set of data.

14. The apparatus of claim 13, wherein
the processing circuit is further configured to:
generate a plurality of sets of data including the second set of data, each of the plurality of sets of data encoding a set of video content, different from the video content of the call;
provide a characterization of video content quality, respectively, for each of the plurality of sets of data; and
prompt the data-communications server to encode video content of the call based on at least one of the plurality of sets of data having a higher quality characterization.

15. The apparatus of claim 14, wherein the processing circuit is further configured to quantify the first set of data characterizing or representing the video content.

16. The apparatus of claim 13, wherein the video content includes data corresponding to video conferences and video media streaming services.

17. The apparatus of claim 13, wherein
the video content of the call is to be encoded according to a configuration of a first codec; and
the processing circuit is further to prompt the data-communications server to use a second codec to encode video content in response to quality of the video content being less than a threshold value.

18. An apparatus comprising:
a data-communications server communicatively coupled to a communication network and configured to receive a first set of data including data characterizing or representing video content of a call; and
a processing circuit coupled to the data-communications server and configured to simulate video content quality of the call by performing operations including:
characterizing a post-transmission quality state of the first set of data;
generating a second set of data including video content that is different from the video content of the call, the second set of data including characteristics indicative of the post-transmission quality state of a first set of data; and
in generating the second set of data:
form a set of model payload;
generate a set of data packets including the set of model payload; and
modify the set of data packets to include characteristics indicative of a post-transmission quality state of the first set of data.

19. The apparatus of claim 18, wherein the characteristics indicative of a post-transmission quality state are based in part on a determination of dropped packets in a sequence of packets included in the first set of data.

20. The apparatus of claim 19, wherein the set of data packets, as modified by the processing circuit, deletes data packets from the set of data packets corresponding to positions of the dropped packets in the sequence of packets included in the first set of data.

21. A data storage device including instructions which, in response to being executed, prompt or cause a method of being carried out, the method comprising:
- via a data-communications server and computer-processing circuitry,
- receiving a first set of data including data characterizing or representing video content of a call; and
- simulating video content quality of the call by performing operations that include:
- characterizing a post-transmission quality state of the first set of data; and
- generating a second set of data, including video content that is different from the video content of the call and characteristics indicative of the post-transmission quality state of a first set of data, by forming a set of model payload, generating a set of data packets including the set of model payload, and modifying the set of data packets to include characteristics indicative of a post-transmission quality state of the first set of data.

\* \* \* \* \*